3,781,236
METHOD OF TREATING A POLYMER LATEX
Kenneth John Bassham, Southampton, and Alan Arthur John Feast, Eastleigh, England, assignors to The International Synthetic Rubber Company Ltd., Southampton, Hampshire, England
Filed June 9, 1972, Ser. No. 261,391
Claims priority, application Great Britain, June 14, 1971, 27,748/71
Int. Cl. C08d 9/14
U.S. Cl. 260—23.7 M                                     8 Claims

ABSTRACT OF THE DISCLOSURE

A method of modifying the particle size distribution of a carboxylated polymer latex comprises:

Figure 1:
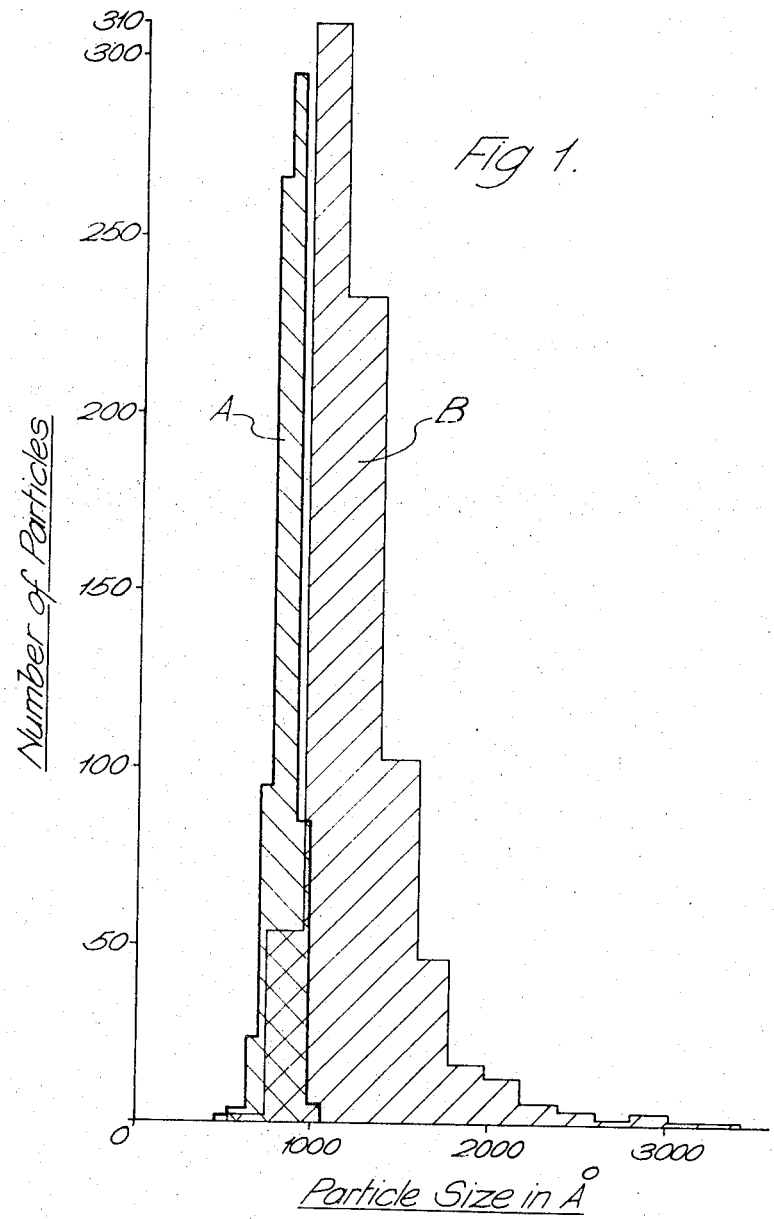

(1) admixing with the latex sufficient of a second emulsifier, which is an organic carboxylic acid salt, at least partially to replace the first emulsifier on the latex particles with the second emulsifier, and
(2) passing the latex containing at least 15% by weight of polymer particles through a constriction at a pressure of not less than 1,000 p.s.i.g.

The process is particularly applicable to latices having a particle size of less than 1,000 A. enabling a latex of increased number average particle size to be obtained. This, in turn, enables concentration of the treated latex to a high solids content.

---

This invention relates to a method of modifying the particle size distribution of a carboxylated polymer latex.

Latices of copolymers of at least 20% by weight of a conjugated diene with an alpha-beta unsaturated carboxylic acid and/or an alpha-beta unsaturated nitrile and optionally other copolymerizable monomers (herein called carboxylated polymer latices) are well known and find wide application in the paper and textile industries. One process of preparing such latices is to polymerize the monomers in emulsion using a sulphate, sulphonate or sulpho succinate emulsifier (herein referred to as the first emulsifier). By adjustment of the emulsifier type(s) and emulsifier content it is possible to obtain a latex having a large average particle size (number average particle diameter), e.g. at least 1,000 angstrom units (A.U.) However, this generally has the disadvantage that the use of special polymerization procedures, e.g. incremental emulsifier addition, and/or long reaction times (e.g. 12 to 20 hours) is required. Without special polymerization procedures and/or long reaction time the number average particle diameter is generally less than 1,000 angstrom units (A.U.) and usually in the range of 650 to 900 A.U. This means that it is not possible to evaporate the latex to a high solids content (at least 50% by weight) easily, if at all.

It is an object of the present invention to provide a simple way of modifying, e.g. increasing, the number average particle diameter of a carboxylated polymer latex as described above so that the above disadvantages may be overcome.

According to the present invention, a method of modifying the particle size distribution of a carboxylated polymer latex prepared by an emulsion polymerization process using a first emulsifier comprising a sulphate, sulphonate and/or sulpho-succinate emulsifier, comprises:

(1) admixing with the latex sufficient of a second emulsifier, which is an organic carboxylic acid salt, at least partially to replace the first emulsifier on the latex particles with the second emulsifier, and
(2) passing the latex containing at least 15% by weight of polymer particles through a constriction at a pressure of not less than 1,000 p.s.i.g.

In one embodiment of the method of the invention the latex has an initial number average particle diameter of less than 1,000 A. and a latex having an increased number average particle diameter is recovered.

A method of treating an emulsion polymerized synthetic rubber latex to reduce its viscosity and/or to increase the size of dispersed polymer particles comprising flowing the latex through a constriction at a pressure not less than 1,000 p.s.i.g., the latex having a concentration of dispersed polymer particles of not less than 15% by weight is described in our British patent specification No. 976,212. We have found that where the latex is a carboxylated polymer latex prepared using a first emulsifier as defined above it is difficult, if not impossible, to effect any modification of the particle size of the polymer particles by passing the latex through a constriction under the stated pressure unless the first emulsifier on the carboxylated polymer particles is at least partially replaced by the second emulsifier, which is a very specific one.

The conjugated diene in the carboxylated polymer latex is generally one having 4 to 8 carbon atoms, examples being butadiene, isoprene, dimethyl butadiene and 2,4-hexadiene. The conjugated diene may be unsubstituted or substituted with one or more other atoms, e.g. halogen. A particular example of such a substituted conjugated diene is chloroprene. Mixtures of conjugated dienes may be used if desired. Butadiene is particularly preferred.

The alpha-beta unsaturated carboxylic acid may contain one or more carboxyl groups. Examples are acrylic acid, methacrylic acid, maleic acid, fumaric acid, crotonic acid, itaconic acid and alpha-chloroacrylic acid. Mixtures of carboxylic acids may be used if desired.

Examples of alpha-beta unsaturated ntriles which may be used in the copolymer are acrylonitrile and methacrylonitrile.

Examples of alpha-beta unsaturated nitrils which may be included in the copolymer are vinyl aromatic monomers such as styrene, alpha methyl styrene, vinyl toluene, vinyl naphthalene; esters of acrylic or methacrylic acid, e.g. ethyl acrylate, methyl methacrylate, hydroxy propyl methacrylate, hydroxy ethyl methacrylate, hydroxy ethyl acrylate and unsaturated acid amides such as acrylamide. Mixtures of copolymerizable monomers may be used.

The conjugated diene is present in the carboxylated copolymer in an amount of at least 20% by weight of the total and may be present combined with the other monomers in a wide variety of proportions. Generally, the unsaturated carboxylic acid is present in an amount of 1 to 10% by weight, e.g. 2 or 3 percent of the total. The unsaturated nitrile, if used, may be present in an amount of, for example, 5 to 15% by weight of the total. The copolymerizable monomers may be present in an amount of up to 70% by weight of the total. Copolymers of e.g. 30 to 60% by weight of a conjugated diene, 65 to 30% by weight of a vinyl aromatic monomer, one or more unsaturated acids and optionally one or more unsaturated acid esters are preferred. Particularly preferred copolymers are butadiene/styrene unsaturated carboxylic acid copolymers, optionally containing an ester of acrylic or methacrylic acid.

The thermoplastic resins which may function as the boxylated polymer latex starting material is a sulphate, sulphonate or a sulpho-succinate emulsifier which are well known in emulsion polymerization. The sulphate may be an alkyl sulphate such as sodium lauryl sulphate or sodium 2-ethyl hexyl sulphate or a sodium alkyl aryl polyether sulphate. The sulphonate may be a sodium alkyl aryl sulphonate, e.g. sodium dodecyl benzene sulphonate; a fatty alcohol alkyl aryl sulphonate, a sodium alkyl aryl polyether sulphonate or a sodium alkyl sulphonate. The sulpho-succinate may be a dialkyl sulpho-succinate such as sodium dioctyl sulpho-succinate, sodium di-isobutyl sulpho-succinate, sodium dihexyl sulpho-succinate or sodium diamyl sulpho-succinate or, for example, tetra sodium N-(1,2-dicarboxyethyl) - N - octadecyl sulpho-succinate. The total amount of first emulsifier used is generally 1 to 10 parts, preferably 2 to 5 parts, per hundred parts by weight of monomers (phm.).

The second emulsifier which is admixed with the polymer latex is an organic carboxylic acid salt, such as a rosin acid salt or an alkali metal salt of an organic carboxylic acid having a chain length of e.g. 12 to 20 or more carbon atoms. Especially suitable salts are those of saturated and unsaturated fatty acids and in particular the salts of unsaturated fatty acids having 15 to 18 carbon atoms (e.g. salts of oleic acid) and salts of palmitic acid. Mixtures of salts may be used. Potassium oleate is very suitable.

The amount of second emulsifier which is admixed with the polymer latex is sufficient to replace at least partially i.e. partially or wholly, the first emulsifier on the polymer particles in the latex. Generally, the amount required is in the range 1 to 4 parts per hundred parts of polymer.

Broadly the same factors as are critical in the method of British patent specification No. 976,212, e.g. the polymer content of the latex, the pressure to which the latex is subjected during treatment, the temperature and the pH of the latex are critical in step (2) of the method of the present invention.

Preferably the solids content of the polymer latex before passage through the constriction (which is preferably the orifice of a homogenizer valve) is 35 to 50% by weight but the solids content may be as low as 15% by weight. Preferably the temperature of the polymer latex is in the range 0° to 50° C., although temperatures of up to 80° C. or even higher may be used. Conventional equipment used for shear homogenizing liquids may be used to perform the method of the present invention, the constriction in such cases being the orefice of the homogenizer valve. An example of a suitable homogenizer is that manufactured by the Manton Gaulin Manufacturing Co., Inc., of Everett, Mass., U.S.A., Model No. 800 KL 24X.8 RAX.

The pressure at which the latex is passed through the orifice may be as high as 10,000 p.s.i.g. or even higher but, in general, pressures in the range 1,000 to 10,000 p.s.i.g. are used. Generally, a greater increase in particle size may be produced if the pumping pressure is increased. Carboxylated polymer latices for treatment by the method of the present invention generally have a pH which is adjusted to be in the range 5 to 9, the pH before adjustment depending on, for example, the amount and type of acid monomer and the first (polymerization) emulsifier. Admixture of the second emulsifier with such a latex increases the pH to e.g. 7 to 11 or more depending on the amount and type of emulsifier used. For example, 2 parts per hundred parts of polymer of potassium oleate added to a latex of pH 6.4 increases the pH to 7.8. Preferably the pH of polymer latices to be treated by the method of the present invention is lower than the preferred pH for the process of United Kingdom Pat. No. 976,212. Thus, pH's in the range of, for example, 5 to 7 are preferred in the method of the present invention. Generally, the pH is lowered to 5.5 to 6.5 by conventional means, e.g. by the addition of carbon dioxide, sodium silico fluoride or glycine to the latex. Preferably the addition of large quantities of sodium silico fluoride is avoided. It is, therefore, preferred that only, for example, 1 to 3 parts per hundred parts of polymer of second emulsifier, such as potassium oleate, is used since above such amounts the pH increase is excessively high.

After treatment by the process of the invention, the pH of the latex may be adjusted to the desired figure depending on the characteristics desired in the latex for further processing. Further, the solids content of the latex may be increased using concentration techniques, for example, by evaporation, thus enabling the preparation of a high solids content latex (having a solids content of at least 50% desirably 60% or more by weight). The viscosity of such latices is of an acceptable figure. Without treatment by the method of the invention the viscosity of the latex increases to an unacceptably high level at a lower solids content and the preparation of a high solids content latex is impossible. High solids content latices are particularly desirable in many applications and, in addition, enable economies to be made in transport costs.

The following examples illustrate the invention.

EXAMPLE 1

A butadiene-styrene-methacrylic acid copolymer latex containing approximately equal proportions of butadiene and styrene copolymerized with 1.8% by weight of monomers of methacrylic acid and prepared using 4.8 parts per hundred parts of monomers of sodium dodecyl benzene sulphonate emulsifier was used in this example. The characteristics of this latex were:

Total solids (percent wt.) _____ 46.3
pH _____ 6.4
Brookfield viscosity (20 r.p.m. spindle 2) ____cps__ 500
Mooney (ML$_4$ at 100° C.) _____ 121
Number average particle size _____A.U__ 804
Surface tension _____dynes/cm__ 56.5

2 parts per hundred parts of polymer of potassium oleate were added to this latex which reduced the viscosity to 150 cps. and increased the pH to 7.8. The surface tension of the latex was 49.9 dynes/cm. The pH of the latex was reduced to 6.55 with sodium silico fluoride and the latex passed at a temperature of 20° C. through a Manton Gaulin homogenizer at a pressure of 5,000 p.s.i.g. The pH of the latex after treatment was 6.6, the viscosity 30 cps. and the surface tension 47.2 dynes/cm. After adjustment of the pH of the treated latex to 8.95, the latex was evaporated to a solids content of 56.3% at a viscosity of 2,200 cps. The number average particle size of the treated latex was 1,120 angstrom units with several particles having sizes in the range 4,000 to 8,500 angstrom units. Very few particles were of size less than 1,000 angstrom units. The particle size distribution before and after treatment (A and B) is shown in FIG. 1. The latex after treatment also contained 2 particles of 4,162 angstrom units, 1 particle of 4,375 angstrom units, 1 particle of 6,250 angstrom units, 1 particle of 6,350 angstrom units and 1 particle of 8,550 angstrom units diameter.

EXAMPLE 2

Example 1 was repeated except that the pH of the latex prior to treatment in the homogenizer (pre-agglomeration) was adjusted to 6.0 and the pressure of the homogenizer was 5,500 p.s.i.g. In this case the pH of the latex after treatment (post agglomeration) was 6.4 and the surface tension 40.8 dynes/cm. After adjustment of the latex pH as before, the latex was evaporated to a solids content of 56.7% at a viscosity of 1,100 cps. On further concentration to a solids content of 58.9% the latex had a viscosity of 1,600 cps.

It was possible to compound the treated latex successfully with up to 550 parts per hundred of polymer of crushed limestone filler, Calmote AD, Derbyshire Stone Co., whereas on addition of only small quantities of filler to the untreated latex, the latex thickened and flocculated badly.

EXAMPLE 3

Example 1 was repeated except that the amount of potassium oleate added, the pH of the latex prior to treatment in the homogenizer and the homogenizer pressure were as shown in the table with the results given.

| Emulsifier amount (phr.) | Agglomeration | | Post agglomeration | | Evaporated latex | | |
|---|---|---|---|---|---|---|---|
| | pH | Pressure (p.s.i.g.) | pH | Surface tension (d./cm.) | Percent solids | Viscosity, cps. | |
| 1 | 5.65 | 2,500 | 6.05 | 48.5 | 52.5 | 750 | |
| 3 | 6.1 | 5,000 | 6.4 | 32.3 | 56.3 | 475 | |

The potassium oleate used in these examples was prepared from potassium hydroxide and oleic acid, the oleic acid being a commercial grade. The oleic acid content of this material was 56% and the oleate was used in the form obtained.

EXAMPLE 4

Figure 2:
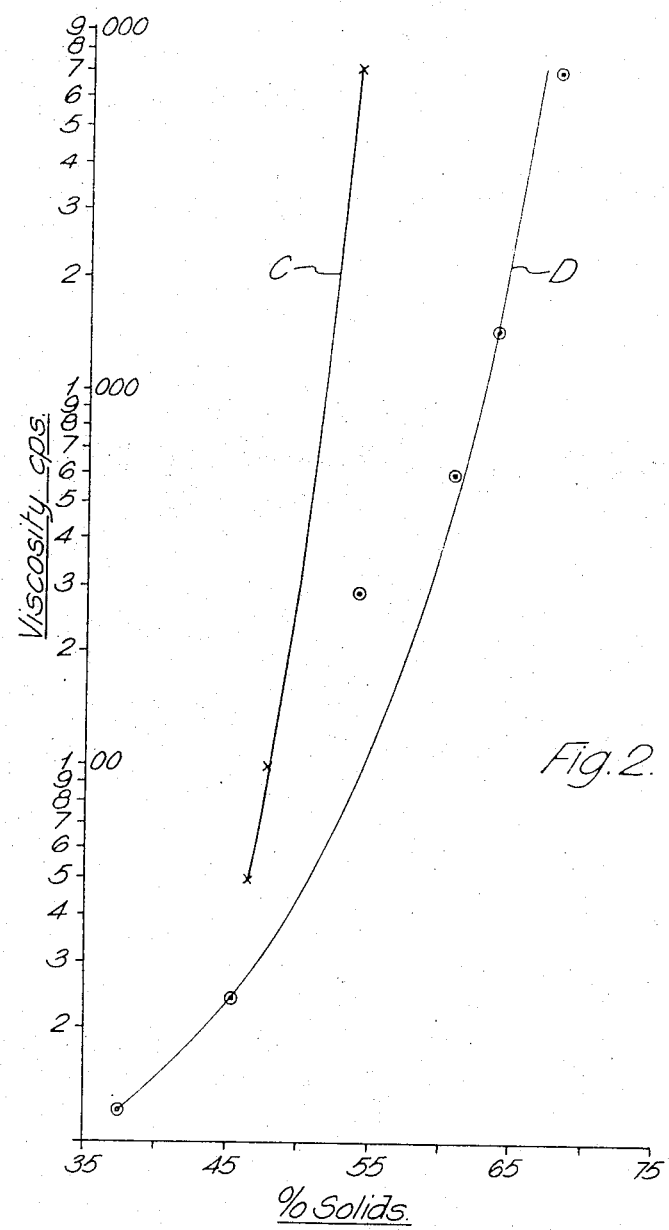

Example 1 was repeated and the viscosity of latex samples after evaporation to various solids contents measured for the latex before and after treatment by the process of the invention. The figures obtained were plotted graphically and are shown in FIG. 2 of the accompanying drawings, in which line C is the untreated latex and line D is the latex treated according to the invention. It can be seen that the latex after treatment can be evaporated to a solids content of 60% at a viscosity of 600 cps. and corresponding improvements are shown at other solids contents.

EXAMPLE 5 (FOR COMPARISON)

(1) Example 1 was repeated without the addition of the potassium oleate. Only very slight agglomeration of the latex was observed.

(2) Example 1 was repeated without the treatment in the homogenizer. The latex after addition of the potassium oleate could be evaporated to a solids content of only 51.1% at a viscosity of 3,050 cps.

These examples indicate that successful agglomeration of the latex can only be achieved by addition of potassium oleate followed by treatment in the homogenizer.

What is claimed is:

1. A method of modifying the particle size distribution of a carboxylated polymer latex prepared by an emulsion polymerization process using a first emulsifier selected from a sulphate, sulphonate and sulpho-succinate emulsifier, characterized by
   (1) admixing with the latex sufficient to modify the particle size of a second emulsifier, which is an organic carboxylic acid salt, at least partially to replace the first emulsifier on the latex particles with the second emulsifier, and
   (2) passing the latex containing at least 15% by weight of polymer particles through a constriction at a pressure of not less than 1,000 p.s.i.g.

2. A method according to claim 1 characterized in that the latex has an initial number average particle diameter of less than 1,000 A., and a latex having an increased number average particle diameter is recovered.

3. A method according to claim 1 characterized in that the second emulsifier is a rosin acid salt or an alkali metal salt of an organic carboxylic acid having 12 to 20 chain carbon atoms.

4. A method according to claim 3 characterized in that the second emulsifier is a sodium or potassium salt of palmitic acid, stearic acid or an unsaturated fatty acid having 16 to 18 chain carbon atoms or mixtures thereof.

5. A process according to claim 4 characterized in that the second emulsifier is potassium oleate.

6. A process according to claim 1 characterized in that the amount of second emulsifier admixed with the latex is 1 to 4 parts by weight per hundred parts of polymer in the latex.

7. A method according to claim 1 characterized in that the polymer is a copolymer of butadiene, styrene and an unsaturated carboxylic acid.

8. A process according to claim 1 wherein the first emulsifier is present in an amount of 1 to 10 parts by weight per 100 parts of polymer in the latex and the amount of second emulsifier admixed with the latex is 1 to 4 parts by weight per 100 parts of polymer in the latex.

References Cited

UNITED STATES PATENTS 3,591,541 7/1971 Athey et al. 260—27 R
3,014,040 12/1961 Howland 260—29.7

OTHER REFERENCES

Skeist, "Handbook of Adhesives," 1962, p. 257.
"Rubber Chem. and Tech.," Brown, 1557, pp. 1832 and 1833.

DONALD E. CZAJA, Primary Examiner

W. E. PARKER, Assistant Examiner

U.S. Cl. X.R.

106—218; 162—168; 260—27 R, 29.7 PT